Sept. 15, 1953   M. BENEDICT   2,652,129
SEPARATION OF MIXED GASES BY ABSORPTION
Filed May 9, 1947
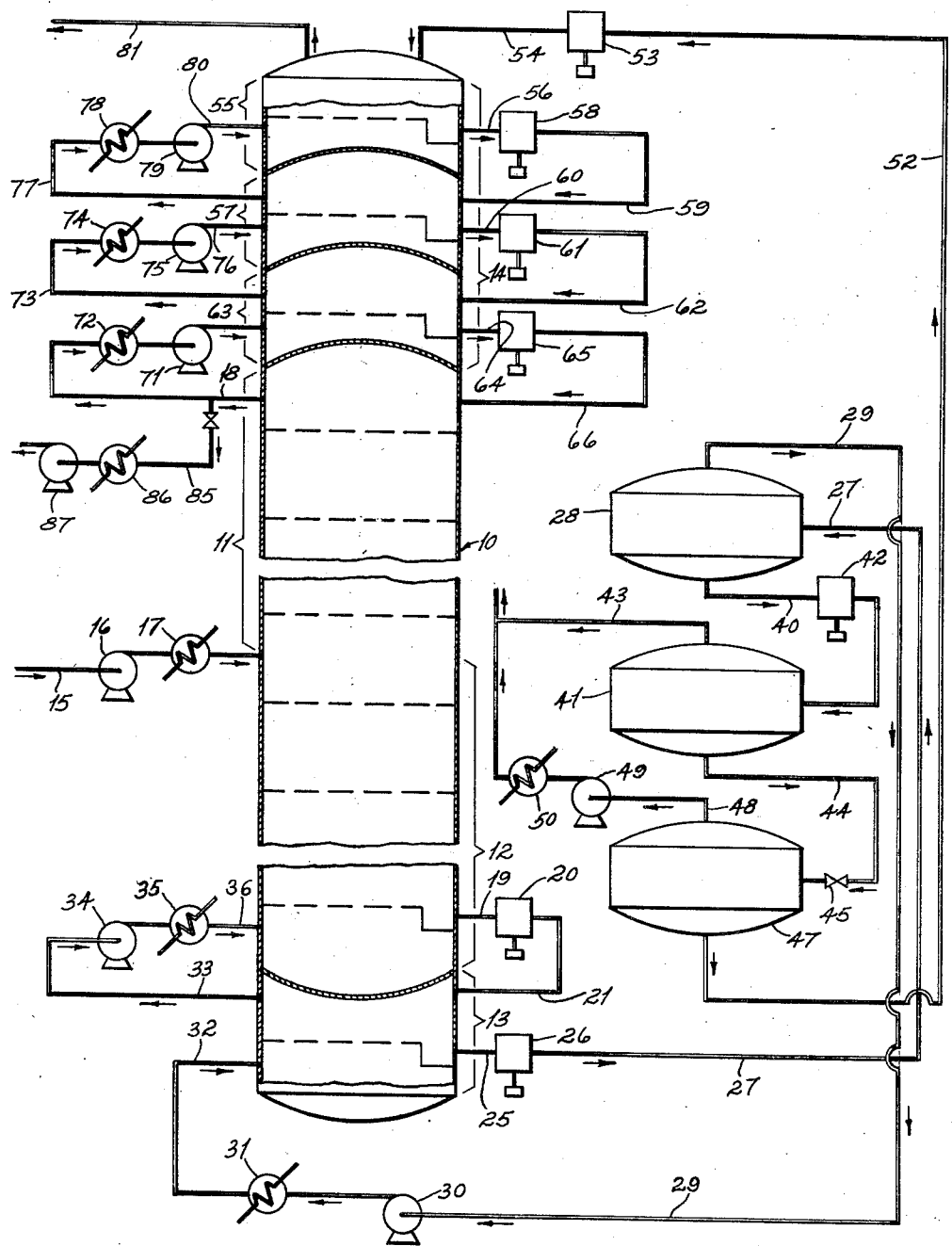
INVENTOR.
MANSON BENEDICT
BY Daniel Stryker
J. H. Grahame
ATTORNEYS Patented Sept. 15, 1953

2,652,129

UNITED STATES PATENT OFFICE 2,652,129

SEPARATION OF MIXED GASES BY ABSORPTION

Manson Benedict, Westfield, N. J., assignor to Hydrocarbon Research, Inc., New York, N. Y., a corporation of New Jersey Application May 9, 1947, Serial No. 747,019

14 Claims. (Cl. 183—2)

The present invention relates to the separation of components of a gas mixture by countercurrent absorption in a liquid absorbent in which the components have differing solubilities, and contemplates operation at improved efficiency and with a reduced net work input. It is particularly concerned with charging lean absorption liquid to the top of an absorption column in such a manner as to permit recovering in useful form, work potentially available in saturating the liquid with the gases present at the top of the column.

In absorption processes for separating the constituents of a mixture which is gaseous at the desired operating conditions, stripped absorption liquid is charged at the top of the absorption column in order to dissolve a portion of the gas mixture which then serves as reflux in effecting the desired separation. As ordinarily practiced, the gas mixture is allowed to dissolve irreversibly in the stripped liquid at the top of the column without producing useful work.

In accordance with the present invention, solution of gas is carried out at the top of the column in the absorption liquid under approximately reversible conditions so that useful work which is ordinarily wasted is realized at this point in the process.

The term, reversible, as applied to a process step is used to mean that the step is so conducted as to require the least work input (or to permit recovery of maximum work output) consistent with the limitations placed on the process step by thermodynamics. In reversible processes, all flow of heat and matter takes place between parts of a system in approximate thermodynamic equilibrium with each other. An example of a reversible process step is the dissolving of a gas in a liquid already substantially saturated by the gas.

In an irreversible process step more work must be supplied (or less work recovered) than the amount predicted by thermodynamics for a reversible process step. Typical examples of an irreversible process step are the mixing of materials which are substantially not in thermodynamic equilibrium, the flow of heat through a substantial temperature difference, and the diffusion of gases through a substantial concentration difference.

In the absorption column, a suitable absorbing liquid flows down in countercurrent relationship to the upward-flowing gaseous mixture to be separated. Because of the difference in solubility of the components of the gas mixture, the liquid becomes progressively and selectively enriched in the more soluble components as it progresses down the column. Rich liquid, withdrawn from the bottom of the fractionating zone of the column, containing a substantial, selected proportion of dissolved gas of relatively high solubility, is subjected to treatment adapted to disengage contained product gas, leaving the residual liquid in lean condition suitable for return to the top of the fractionating zone. Direct charging of this stripped lean absorbing liquid at the top of the zone into contact with the stream of tops gas would result in substantial loss of potentially available work which could be recovered if the liquid were brought into contact with the gas under reversible conditions.

In accordance with the present invention, a substantial portion of this potentially available work is recovered in useful form by dissolving the gas in the absorbing liquid under nearly reversible conditions.

To this end, gas from the top of the fractionating zone is expanded to a lower pressure stage in an engine to recover useful work, the expanded gas is contacted with the absorbing liquid in the lower pressure stage so as to saturate the absorbing liquid at least partially with the gas. The lower pressure stage thus acts as a "saturating step" for the absorbing liquid which is being returned to the fractionating zone. To recover more of the work potentially available, it is advisable to employ a plurality of saturating stages or zones arranged in series and maintained at progressively lower pressures in the direction of gas flow or progressively higher pressures in the direction of absorbing liquid flow. It is clear that the larger the number of saturating stages in each of which gas expanded from a higher pressure contacts liquid pumped from a lower pressure, the more truly reversible becomes the operation.

Obviously, from the foregoing, with an increase in the number of expansion stages, useful mechanical work recovered approaches that potentially available in saturating lean oil with gas, which is otherwise consumed or wasted in the irreversible absorption of gas in lean oil of the column pressure. The potentially recoverable work lost in irreversible steps involved in the charging of lean oil at column pressure in typical gases is often greater than the minimum reversible work of separation.

While the invention is broadly applicable to any absorption system wherein a lean absorbent liquid is introduced into a fractionating zone operating at any substantial pressure, it is particularly advantageous in connection with separations wherein absorption and disengagement are effected primarily through changes in pressure; that is, where the variation of gas solubility in the liquid with temperature is so slight as to require that absorption and disengagement be effected essentially by a change in pressure. In short the invention finds special application in the separation of at least semi-permanent gases, which term is intended to include preferably the permanent gases as well as those gases, the critical point of which is below about 100° F., which possess a characteristically low temperature coefficient of solubility. For the purpose of the present specification and claims, the process whereby absorptive separation is effected essentially by solution of the gas at a higher pressure and disengagement at a lower pressure is referred to as isothermal absorption, whether or not temperature variations are incidentally involved.

The present invention is particularly applicable to absorption systems acting upon a gas mixture where the difference in solubility between the components of the mixture is slight. In fact, the work potentially recoverable through reversible solution increases quite materially as the solubilities of the gases to be separated approach each other. The benefit therefore is particularly pronounced where the relative volatility of the component gases in the liquid absorbent, expressed as the ratio of the volume solubility of the more soluble to the less soluble component, is not substantially greater than about 2.0 (2:1) and preferably less than about 1.5 (1.5:1).

In order to describe the invention more in dedetail, reference is now made to the accompanying drawing where one exemplary embodiment is disclosed more or less diagrammatically for the purpose of simplifying understanding of the invention.

In the drawing, the numeral 10 represents a gas-liquid contact tower comprising a rectifying or enriching section 11, a stripping section 12, a disengaging section 13, and a saturating section 14. Sections 11 and 12 taken together comprise the main fractionating zone in which the principal separation of the components of the gas mixture occurs. Further fractionation of the components of the gas mixture occurs in sections 13 and 14, accompanied by solution of gas in 14 and separation of gas in 13.

In order to further facilitate specific description of the embodiment, reference thereto will be made in terms of a process employing an absorption liquid comprising a suitable hydrocarbon oil capable of absorbing feed gas under elevated pressure and appropriate temperature. Each of the column sections may be of typical packed tower or bubble tower arrangement comprising vertically spaced trays through which the downcoming oil successively passes in good surface contact with upflowing gases.

The mixed feed gases are introduced to a lower portion of the enriching section 11 from any convenient source not shown through pipe 15 by way of a compressor 16, delivering at elevated column pressure, and a cooling heat exchanger 17 which brings the hot compressed gases to the desired column temperature, as for example, 100° F.

In the enriching section the gases pass upwardly, while the gases dissolved in the downcoming oil are progressively enriched in the more soluble component. The tops gas, thus highly concentrated in relatively less soluble gas, is withdrawn through outlet pipe 18 for treatment, as will hereinafter be described in more detail.

The enriched oil continues to pass downwardly through the stripping secion 12, where the dissolved gas is further enriched in the more soluble component, and is withdrawn near the base thereof through outlet pipe 19, passed through a suitable engine 20, such as a Pelton wheel, at a substantially lower pressure and introduced into the top of the disengaging section 13 through pipe 21. The pressure in section 13 is some intermediate pressure between that of the main column or fractionation zone, and the final pressure of disengagement.

After passing through the section 13 at an intermediate pressure, the oil is withdrawn through pipe 25, passed through a second impulse engine 26 to a lower, intermediate pressure level with the recovery of mechanical work, and introduced by pipe 27 into a flash drum 28. Preferably the flash drum 28 operates at that lower pressure which causes the disengagement of a quantity of absorbed gases sufficient to strip light gas dissolved in the liquid flowing through sections 12 and 13.

This gas is withdrawn through pipe 29, recompressed to the pressure of section 13 by compression means 30, cooled to tower temperature in exchanger 31, and conveyed by pipe 32 to a lower portion of the disengaging section 13, where it passes upwardly in countercurrent relation to the downflowing rich oil. Here it tends to additionally strip or disengage the less soluble component of the gas mixture with resulting enrichment of the oil in the desired gaseous constituent of greater solubility.

Gaseous effluent from the top of section 13 is withdrawn as at 33, compressed to the operating pressure of the main tower sections by compressor 34, and cooled to tower temperature by exchanger 35, thence passing directly into the lower part of the stripping section by way of conduit 36.

Referring now to the liquid product of flash drum 28, this is withdrawn through pipe 40 and reduced to the lower pressure of flash drum 41, by passage through a further impulse engine 42 effective to deliver useful mechanical work.

While, as intimated above, any desired number of expansion stages may be employed, the present embodiment discloses an arrangement wherein flash drum 41 operates at substantially atmospheric pressure, whereby the disengaged gas withdrawn through pipe 43 is delivered, at a convenient pressure, as essentially pure or enriched bottoms product gas. To effect a further disengagement of absorbed bottoms gas, the residual oil from flash drum 41 is withdrawn as at 44, and passed through throttle valve 45 into a final flash drum 47 operating at a suitably low vacuum, as for example, 2 p. s. i. a. Therein, occurs substantially complete disengagement of absorbed bottoms gas, which passes out through pipe 48, compressor 49, and cooling heat exchanger 50 into the outlet header or conduit 43 at atmospheric pressure.

The resulting lean oil from the flash drum 47 is passed through recycle conduit 52 by a lean oil pump 53, to the top of the tower for continuous repetition of the separation process.

As above indicated, the upper or reversible saturating section 14 of the tower comprises, in the present embodiment, three separate saturation sections or stages operating at appropriate intermediate pressures between the low pressure of final disengagement and operating pressure of the enriching section. Accordingly, the upper or first saturation section 55 receives the incoming lean oil by way of pipe 54, at a suitable initial pressure, where it flows downwardly countercurrent to upflowing tops gas, and is withdrawn at 56 and injected into the upper portion of a second stage saturation section 57 by pump 58 and inlet pipe 59. Passing downwardly through the second stage at an increased intermediate pressure, the stream of oil is withdrawn from a lower portion as at 60, and passed by pump 61 and inlet pipe 62, into a third saturation section 63, operating at a pressure intermediate between that of the second stage section and the pressure of the enriching section. After passage downwardly through the section 63, the stream withdrawn as at 64 is raised to main tower pressure by pump 65, and injected into the upper portion of the enriching section through inlet pipe 66.

The tops gas or effluent from the enrichment section, rich in the less soluble constituent of the initial feed, is withdrawn through the previously mentioned outlet pipe 18 and passed through an expansion engine 71, into a lower portion of the third saturation stage 63. Useful work realized in the expansion engine 71 may be utilized for any desired purpose.

Advantageously, in so-called isothermal absorption operations such as that herein selected for the purpose of illustration, the stream of gas is first supplied with thermal energy in heat exchanger 72, whereby a more or less regular column temperature is maintained, and a correspondingly increased recovery of mechanical work realized in the expansion engine 71.

In the third stage gas-liquid contactor increased saturation of oil is effected, and the residual gas is withdrawn through pipe 73, preferably passed through a second heating exchanger 74, and then through a second expansion engine 75, operating as before to recover mechanical work and discharge the gaseous stream through pipe 76 into the lower portion of the second saturation stage at appropriate temperature and pressure.

In the same manner the gaseous product of the second stage is removed as at 77, passed through heating exchanger 78, and expander 79, and injected into the upper or initial saturation stage 55 through pipe 80. The gas withdrawn from the top portion of this stage through outlet pipe 81 comprises separated product rich in the less soluble constituent of the feed.

Many other variations in the above embodiment will be apparent to those skilled in the art in light of the foregoing disclosure. For example, instead of passing the entire gaseous effluent from the enriching section through the lean oil saturation sections, the main flow of light product gas or any portion thereof can be withdrawn through valved branch pipe 85 which communicates with pipe 18. In this modification, it is, of course, advantageous to pass at least sufficient of the gas through the saturation stages so that maximum saturation of the incoming oil is effected. Available mechanical energy may be recovered from the relatively high pressure gas stream in pipe 85 by passage through heat exchanger 86 and expansion engine 87 as before.

It is particularly important to note that the low grade heat requirements of the heating exchangers 72, 74, and 78 as well as exchanger 86 are readily met by the available heat recovered in the process. Thus, for example, cooling exchangers 17, 31, 35 and 59, in the usual case, handle heat energy amply sufficient for this purpose. Interconnection of the several heat exchangers for this purpose has not been shown since the many possible variations thereof are within the province of any skilled engineer, and further, because the complex details might obscure a clear understanding of the principles of the present invention. Nevertheless, the invention clearly contemplates such an arrangement as, for example, where a suitable heat exchange liquid such as water, Dowtherm or mercury passes countercurrently to the gas stream through any or all of the aforementioned coolers and is thereafter pumped through the heating exchangers 72, 74, 78 and 86, preferably countercurrent to the stream of gases for transferring thermal energy thereto in any desired rate.

In the foregoing embodiment, it will be apparent that the lean oil supplied to the tower is progressively saturated with product gas in a series of stages of relatively increasing pressure such that solution takes place under conditions more closely approaching equilibrium than in the case where lean oil is charged directly into an absorption tower and operating pressure. As indicated above, with increase in the number of saturation stages, the conditions even more closely approach thermodynamic equilibrium with its corresponding high efficiency of reversible absorption. It follows therefore that potentially available work otherwise lost or consumed in the irreversible saturation of lean oil with tops gas at the elevated pressure of the enriching section, is recovered as useful work in the expansion engines 71, 75 and 79, and that moreover the total useful work thus recoverable increases with the number of saturating stages at intermediate pressures. As further intimated above, the work thus recoverable may be substantial.

For instance, an example will be given of an absorption system employing substantially the arrangement described above as applied to the separation of a gaseous feed comprising ethylene and ethane in approximately the following proportion:

|  | Mols | Mol Percent |
| --- | --- | --- |
| Ethylene | 0.4948 | 49.5 |
| Ethane | 0.5052 | 50.5 |

The pressure in the enriching and stripping sections of the column is 300 p. s. i. a., and the tower and flash drums are maintained at substantially 100% F. throughout.

The absorbing liquid comprises a narrow range paraffinic absorption oil of about 38 A. P. I. gravity, and a molal average boiling point of 500° F., supplied to the tower at the rate of about 18 cubic feet (about 4.42 mols) per mol of feed gas. This involves a lean oil rate of about 1.5 times the minimum lean oil rate at which separation will take place under conditions of highest thermodynamic efficiency.

For purposes of affording a fair relative evaluation, the feed and product gases are respectively supplied and withdrawn at atmospheric pressure and 100° F. The saturation or absorption of the tops gas in the lean oil is carried out in three stages, as in the above embodiment at appropriate, successively increasing pressures intermediate between the lowest lean oil pressure and that of the main section of the tower. More specifically, the three saturating sections operate, in the order of introduction of the lean oil thereto, at the following pressures:

|  | P. s. i. a. |
| --- | --- |
| Top saturating section | [1] 14.7 |
| Second saturating section | 40 |
| Third saturating section | 110 |

[1] Atmospheric pressure.

Each comprises one bubble tray. The enriching section contains 21 trays, and the stripping section 8 trays. The lower portion of the tower is provided with a disengaging section containing one tray and operating at 150 p. s. i. a. and 100° F. The first flash drum operates at 60 p. s. i. a. and 100° F., and the entire gaseous stream disengaged therein is recompressed to 150 p. s. i. a. and 100° F. for passage upwardly through the disengaging stage. The gaseous effluent from the last named stage is thereafter compressed to main tower pressure of 300 p. s. i. a. at 100° F., and introduced into the bottom of the stripping section.

The rich oil from the first flash drum successively passes to two more flash drums in series operating respectively at atmospheric pressure and 2 p. s. i. a. with discharge of the bottom product gas at atmospheric pressure and 100° F. as noted above. The impulse engines recover the useful mechanical work in conducting the oil stream from the stripping section to the succeeding disengaging section, and the succeeding flash drums.

The system is designed to deliver, from the top of the first or initial oil saturating section, a product containing approximately 95 mol percent ethylene and 5 mol percent ethane and a bottoms product gas having the approximate composition of 91.8% ethane, and 8.2% ethylene on a molar basis.

Following is a table showing design relationships, neglecting heat of absorption and desorption of the feed gases and assuming isothermal expansion and compression, between the work, in foot pounds per mol of feed gas, required for operation of the above system, with particular reference to the saturating instrumentalities, and the useful work recovered, under an operational efficiency allowance of 70% for the expansion engines and compressor, and 85% for the oil pumps.

| | Ft. lbs. per mol Feed Gas | |
|---|---|---|
| | Work Supplied to System | Work Recovered |
| Compression of feed gas from atmospheric to 300 p. s. i. a. | 3,074,000 | |
| Lean Oil compression: Recycle lean oil pump, 38,100 foot pounds. Oil pump to second stage, 76,200 foot pounds. Oil pump to third stage, 212,000 foot pounds. Oil pump to enriching section, 591,000 foot pounds. | 917,300 | |
| Useful work delivered by tops gas expanders: Expansion to third stage, 726,000 foot pounds. Expansion to second stage, 437,000 foot pounds. Expansion to first stage, 331,000 foot pounds. | | 1,494,000 |
| Compression of bottoms gas: First stage decompression to stripping section, 2,619,000. Second stage flash drum to first stage decompression section, 1,028,000. Final flash drum to atmospheric, 227,000. | 3,874,000 | |
| Useful work delivered by Pelton wheels: Expansion to first stage, 329,000. Expansion to second stage drum, 175,000. Expansion to third stage atmospheric drum, 83,100. | | 587,100 |
| Totals | 7,865,300 | 2,081,100 |
| Net Work | 5,784,200 | |

For purposes of contrast, there follows a similar table comparing the design characteristics of a comparable absorption system in which the lean oil is charged directly at column pressure and temperature without reversible saturation into the upper portion of the enriching zone in the vicinity of the point of withdrawal of the tops gaseous product, which is heated as required, and passed through a similar expansion engine, delivering at atmospheric pressure and 100° F., for the recovery of potentially available mechanical work. In this case, conditions and apparatus are otherwise the same as in the example, except that the enriching section of the tower employs 18 trays and stripping section 8 trays whereby an indentical product separation is effected.

| | Ft. lbs. per mol Feed Gas | |
|---|---|---|
| | Work Supplied to System | Work Recovered |
| Compression of feed gas from atmospheric to 300 p. s. i. a. | 3,074,000 | |
| Lean oil compression | 895,000 | |
| Expansion of tops gas | | 879,000 |
| Compression of bottoms gas: First stage decompression to stripping section, 2,619,000. Second stage flash drum to first stage decompression section, 1,028,000. Final flash drum to atmospheric, 227,000. | 3,874,000 | |
| Useful work delivered by Pelton wheels: Expansion to first stage, 329,000. Expansion to second stage drum, 175,000. Expansion to third stage atmospheric drum, 83,100. | | 587,100 |
| Totals | 7,843,000 | 1,466,100 |
| Net Work | 6,376,900 | |

The foregoing example discloses a net saving of 593,000 foot pounds of mechanical work per mol of feed gas in the process herein disclosed as compared with a process where the lean oil is charged directly at main column pressure. This may be compared with the approximately 389,000 foot pounds per mol of feed gas minimum thermodynamic work necessary to effect this separation. The remainder of the work expended is, of course, dissipated through compressor and expander inefficiencies and irreversible losses elsewhere in the system.

While the invention has been particularly disclosed in connection with separation of ethylene-ethane mixtures, it is applicable to any process of gas absorption separation of which I am aware, and particularly those wherein absorption and disengagement are effected principally by means of change in pressure. Accordingly, any mixture of feed gases of close relative solubility may be thus separated and as intimated above, the work recovery becomes highly significant where the ratio of solubilities approaches unity, as for example, in the separation of hydrogen, from deuterium, or of methane containing carbon-13 from ordinary methane.

Obviously, the specific absorbing liquid, per se, forms no part of the present invention, and may be selected with due regard to the controlling factors of solubility and conventional practices known to those skilled in the art, taking into consideration the character of the gases to be separated. Thus, while the improvement is particularly valuable in the case of so-called isothermal absorption, it may be broadly practiced, usually with some material benefit, in any type of absorption process wherein a gaseous stream is contacted with lean absorbing liquid under conditions otherwise sufficiently remote from equilibrium, so that useful work, during solution of gas in liquid, can be produced by the means described herein.

The present invention is moreover not limited to the particular method for disengagement specifically exemplified.

In its broadest aspect, the invention contemplates, for example, adaptation and incorporation of conventional, though less efficient procedures for recovery of the absorbed gas from rich absorbing liquid withdrawn from the main column sections. Such conventional procedures are exemplified by single stage decompression, heating, distillation, extraction, or otherwise. The lean oil after decompression is then made available for recycle to the successive saturation stages as disclosed.

It is particularly important to note that the several engines or any combination thereof may advantageously be mechanically interconnected to deliver work from a common drive means. For example, the several expansion engines recovering useful work from the expanding gases may be disposed on a common shaft or axially interconnected for application of their combined output to the actuation of any unitary means, not shown, requiring the expenditure of mechanical work.

Obviously many modifications and variations of the invention as hereinbefore set forth, may be made without departing from the spirit and scope thereof, and therefore only such limitations should be imposed as are indicated in the appended claims.

I claim:

1. In the separation of mixed gases of different solubilities by continuous fractionating absorption in contact with a stream of absorbing liquid under conditions including a pressure effective to cause selective enrichment of the absorbed gases in the more soluble component of the said mixed gases, followed by disengagement of absorbed gas from the absorbing liquid, and return of the lean absorbing liquid for fractionation of said mixed gases, the steps which comprise passing said mixed gases in a fractionating zone under pressure in contacting relation to the absorbing liquid, withdrawing undissolved gas from the absorbing liquid after contact therewith at said pressure, reversibly expanding withdrawn gas to a lower pressure level and at said lower pressure effecting absorbing of the expanded gas in the lean absorption liquid under conditions approaching equilibrium, recovering mechanical work of expanding the gas, and supplying the thus partially saturated absorbing liquid to passage in contact with said mixed gases in said fractionating zone under pressure as said absorbing liquid.

2. The method defined in claim 1 wherein reversible expansion of the withdrawn gas and the absorption of the expanded gas in the lean liquid absorbent is carried out in a plurality of stages of successively lower pressure.

3. The method defined in claim 1 wherein thermal energy is supplied to the said withdrawn gas prior to expansion.

4. The method defined in claim 1 wherein the mixed gases subjected to separation have a relative volatility in the absorbing liquid of not greater than 2:1.

5. The method defined in claim 1 wherein the mixed gases subjected to separation have a relative volatility in the absorbing liquid of not greater than 1.5:1.

6. In the separation of mixed gases of different solubilities by preferential absorption of the more soluble gas in a liquid absorbent flowing in countercurrent contact with the mixed gases in a fractionating zone under pressure, the improvement of recovering the potentially available work otherwise consumed in the irreversible absorption of tops gas from said fractionating zone in lean liquid absorbent at the pressure of said fractionating zone, which comprises expanding said tops gas to a lower pressure with the performance of work, contacting said lean liquid absorbent with the expanded gas at said lower pressure to dissolve part of said expanded gas in said lean liquid absorbent, supplying said liquid absorbent containing dissolved gas to said fractionating zone, and recovering the work performed in expanding said tops gas.

7. In the separation of mixed gases of different solubilities by absorption in a stream of absorbing liquid in which the solubility of the gases increases materially with pressure, and wherein the stream of mixed gases is continuously passed in countercurrent contacting relationship with a stream of absorbing liquid under an elevated pressure in a fractionating zone, the gases withdrawn from the top portion of said fractionating zone after passage therethrough, the enriched liquid absorbent subjected to pressure release to separate the dissolved gas, and the lean liquid returned to the top portion of the fractionating zone, the improvement which comprises at least partially saturating said lean liquid with said withdrawn product gas by expanding with the performance of useful work such gas to a plurality of successively decreasing intermediate pressure levels between the pressure of the fractionating zone and that minimum pressure at which the absorbing liquid will dissolve such gas and by dissolving a portion of the gaseous stream at such intermediate pressure levels in the stream of lean liquid under relatively reversible conditions in the order of increasing pressure, charging thus partially saturated liquid as absorbing liquid feed to the fractionating zone, and recovering the useful work of expansion.

8. The method defined in claim 7 wherein the gases subjected to separation are at least semipermanent gases.

9. Apparatus for the separation of mixed gases of different solubilities by fractionating enrichment of a stream of said gases flowing in countercurrent contacting relationship under pressure, with a stream of absorbing liquid effective to preferentially absorb relatively more soluble gas, including fractionating means for conducting said stream of mixed gases under pressure in countercurrent contacting relationship with a stream of absorbing liquid, a plurality of expansion engines effective to recover useful mechanical work from expanding gas, means for supplying effluent undissolved gas from said fractionating means to said expansion engines in successive series relationship, means for dissolving expanded gas from a succeeding expansion engine in lean absorbing liquid to effect at least partial saturation thereof, means thereafter for dissolving additional expanded gas from a preceding expansion engine in said partially saturated absorbing liquid, and means for introducing thus partially saturated absorbing liquid as liquid absorbent to said fractionating zone as aforesaid.

10. The apparatus specified in claim 9 wherein a plurality of said engines are associated to deliver their combined output of useful mechanical work to a single drive means.

11. In the separation of mixed gases of different solubilities by preferential absorption of the more soluble gas in a liquid absorbent flowing in countercurrent contact with said mixed gases in a fractionating zone under elevated pressure, said separation involving withdrawal of unabsorbed tops gas from said fractionating zone, decompression of enriched liquid absorbent to release absorbed gas therefrom, and return of the resulting lean liquid absorbent to said fractionating zone, the improvement of absorbing said tops gas in said lean liquid absorbent under relatively reversible conditions prior to the return of said liquid absorbent to said fractionating zone, which comprises expanding with the performance of work said tops gas to an intermediate pressure between that of said fractionating zone and that to which the enriched liquid absorbent is decompressed, effecting absorption of the expanded gas in said lean liquid absorbent at said intermediate pressure, and recovering the work performed in expanding said tops gas.

12. The method defined in claim 11 wherein the tops gas is heated prior to the expansion thereof.

13. The method defined in claim 11 wherein the steps of expanding the tops gas and of effecting absorption of the expanded gas in the liquid absorbent are carried out in a plurality of stages of successively lower pressure.

14. The method defined in claim 13 wherein the tops gas is heated prior to each expansion thereof.

MANSON BENEDICT.

References Cited in the file of this patent

UNITED STATES PATENTS

| Number | Name | Date |
|---|---|---|
| 1,769,698 | Laird | July 1, 1930 |
| 2,015,223 | Horsley | Sept. 24, 1935 |
| 2,059,494 | Shiras | Nov. 3, 1936 |
| 2,219,529 | Pyzel | Oct. 29, 1940 |
| 2,241,717 | Robinson et al. | May 13, 1941 |
| 2,316,744 | Mellett et al. | Apr. 13, 1943 |

FOREIGN PATENTS

| Number | Country | Date |
|---|---|---|
| 697,603 | Germany | Oct. 19, 1940 |

OTHER REFERENCES

Refiner and Natural Gasoline Manufacturer, vol. 21, No. 6, pages 70 to 75.